US012536816B2

(12) United States Patent
Miyamoto

(10) Patent No.: US 12,536,816 B2
(45) Date of Patent: Jan. 27, 2026

(54) OCCUPANT STATE MONITORING APPARATUS

(71) Applicant: SUBARU CORPORATION, Tokyo (JP)

(72) Inventor: Shinichi Miyamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 411 days.

(21) Appl. No.: 18/178,077

(22) Filed: Mar. 3, 2023

(65) Prior Publication Data

US 2023/0306758 A1   Sep. 28, 2023

(30) Foreign Application Priority Data

Mar. 22, 2022   (JP) ................. 2022-045713

(51) Int. Cl.
| | |
|---|---|
| *G06V 20/59* | (2022.01) |
| *B60W 40/08* | (2012.01) |
| *B60W 50/14* | (2020.01) |
| *G06V 40/18* | (2022.01) |

(52) U.S. Cl.
CPC .......... *G06V 20/597* (2022.01); *B60W 40/08* (2013.01); *B60W 50/14* (2013.01); *G06V 40/18* (2022.01); *B60W 2050/143* (2013.01); *B60W 2420/403* (2013.01); *B60W 2540/225* (2020.02); *B60W 2540/229* (2020.02)

(58) Field of Classification Search
USPC ....................................................... 382/100
See application file for complete search history.

(56) References Cited

U.S. PATENT DOCUMENTS

| | | | | |
|---|---|---|---|---|
| 6,200,139 | B1* | 3/2001 | Clapper ................. | G09B 9/042 |
| | | | | 600/587 |
| 2012/0307059 | A1 | 12/2012 | Yamakage et al. | |
| 2017/0352128 | A1 | 12/2017 | Sasao et al. | |
| 2019/0213402 | A1* | 7/2019 | Yang ...................... | G06V 40/19 |
| 2022/0363283 | A1* | 11/2022 | Prill ....................... | B60W 40/08 |
| 2023/0302992 | A1* | 9/2023 | Iwata ..................... | B60W 50/14 |

FOREIGN PATENT DOCUMENTS

| | | |
|---|---|---|
| JP | H07-96768 A | 4/1995 |
| JP | H08-305993 A | 11/1996 |
| JP | H10-138791 A | 5/1998 |
| JP | 2012-101564 A | 5/2012 |
| JP | 2015-118579 A | 6/2015 |
| JP | 2018-073339 A | 5/2018 |
| JP | 2021-043637 A | 3/2021 |
| JP | 2021-131668 A | 9/2021 |
| WO | 2011/064831 A1 | 6/2011 |

OTHER PUBLICATIONS

Notice of Reasons for Refusal received in corresponding Japanese Patent Application No. 2022-045713, dated Oct. 28, 2025.

* cited by examiner

*Primary Examiner* — Jacky X Zheng
(74) *Attorney, Agent, or Firm* — Rimon P.C.

(57) ABSTRACT

An occupant state monitoring apparatus includes an imager and a calculation controller. The imager is configured to capture an image of a region including an eyeball of an occupant who is in a vehicle, to obtain an image. The calculation controller is configured to detect, based on a part of the eyeball reflected in the image, a line of sight of the occupant and a device disposed in a compartment of the vehicle, and monitor a state of the occupant based on the device and a change in the line of sight.

13 Claims, 6 Drawing Sheets

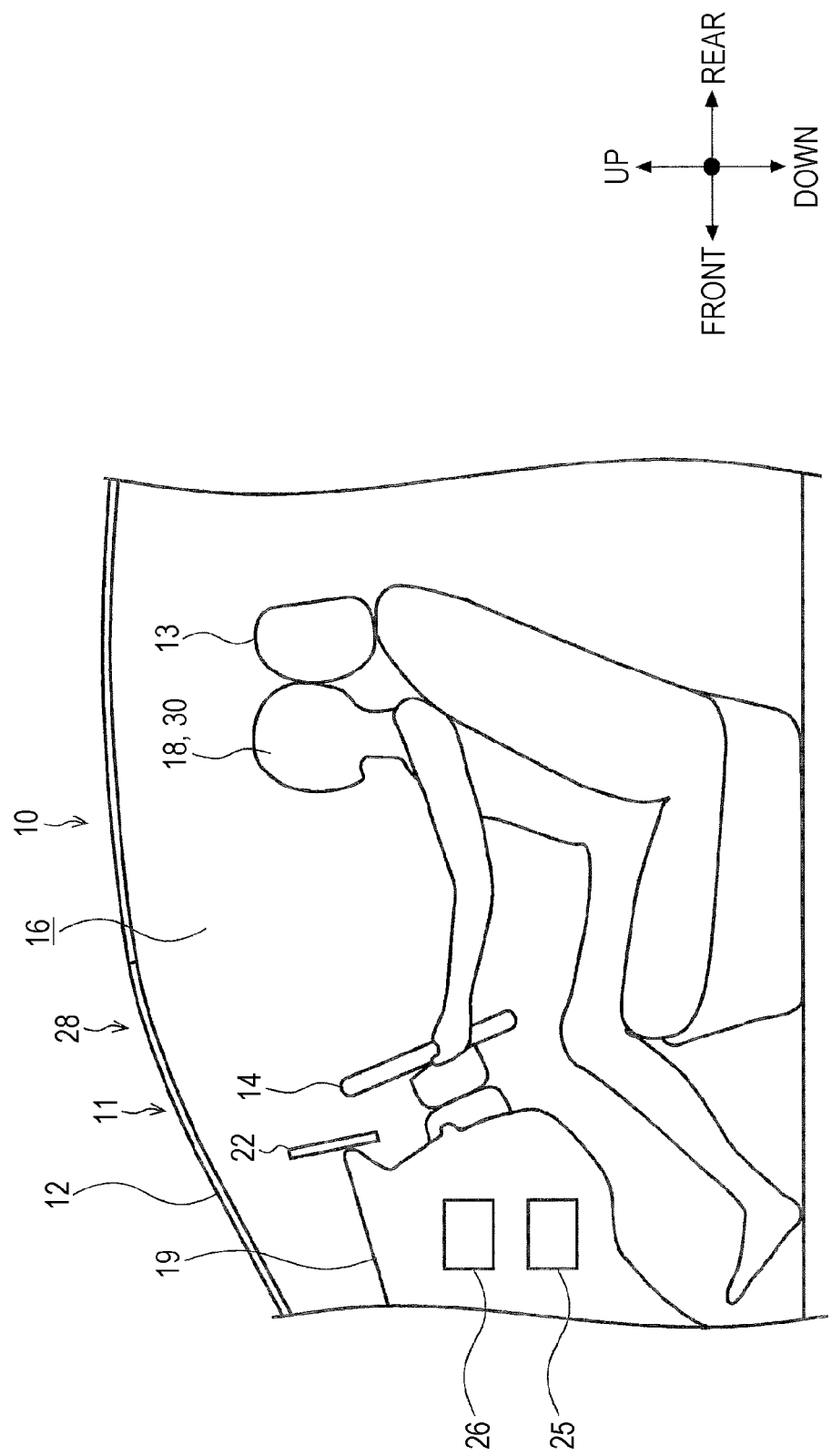

2

OCCUPANT STATE MONITORING APPARATUS

CROSS-REFERENCE TO RELATED APPLICATIONS

The present application claims priority from Japanese Patent Application No. 2022-045713 filed on Mar. 22, 2022, the entire contents of which are hereby incorporated by reference.

BACKGROUND

The disclosure relates to an occupant state monitoring apparatus.

As a conventional apparatus for monitoring a state of an occupant in a vehicle, for example, there are known structures disclosed in Japanese Unexamined Patent Application Publication (JP-A) Nos. 2012-101564 and 2018-073339.

In JP-A No. 2012-101564, a line-of-sight detection apparatus detects a direction of a driver's line of sight, and a light projection unit performs irradiation of light from a light source in a predetermined direction. When a control apparatus determines, based on a result of detection performed by the line-of-sight detection apparatus, that the direction of the driver's line of sight is shifted by a predetermined angle or more with respect to a forward direction of a vehicle, the control apparatus causes the light projection unit to perform irradiation of light to a position shifted toward the forward direction with respect to the direction of the driver's line of sight, the position being in the vicinity of an area to which the driver's line of sight is directed. Consequently, it is possible to effectively correct a state of an occupant from a distracted state to a normal state of concentrating on a driving operation without occupying a large installation space in a vehicle interior.

In JP-A No. 2018-073339, a face, eyeballs, and the like of a user are imaged by a camera, and a gaze point of the user is detected and analyzed by image processing, thus determining whether the user is a driver who drives a moving body. In addition, when it is determined that the user is the driver and a moving speed is equal to or higher than a set speed, an electronic device executes an accident prevention measure. The accident prevention measure is, for example, forcible function restriction or operation stop of the electronic device. This makes it possible to prevent a serious accident in advance.

SUMMARY

An aspect of the disclosure provides an occupant state monitoring apparatus. The occupant state monitoring apparatus includes an imager and a calculation controller. The imager is configured to capture an image of a region including an eyeball of an occupant who is in a vehicle, to obtain an image. The calculation controller is configured to detect, based on a part of the eyeball reflected in the image, a line of sight of the occupant and a device disposed in a compartment of the vehicle, and monitor a state of the occupant based on the device and a change in the line of sight.

An aspect of the disclosure provides an occupant state monitoring apparatus. The occupant state monitoring apparatus includes a camera and circuitry. The camera is configured to capture an image of a region including an eyeball of an occupant who is in a vehicle, to obtain an image. The circuitry is configured to detect, based on a part of the eyeball reflected in the image, a line of sight of the occupant and a device disposed in a compartment of the vehicle, and monitor a state of the occupant based on the device and a change in the line of sight.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 1A is a side view illustrating a vehicle including an occupant state monitoring apparatus according to an embodiment of the disclosure;

DETAILED DESCRIPTION

The techniques disclosed in JP-A Nos. 2012-101564 and 2018-073339 described above have room for improvement from the viewpoint of more accurately monitoring the state of the occupant.

For example, in the techniques disclosed in JP-A Nos. 2012-101564 and 2018-073339, existence of a device such as a smartphone in the vicinity of a dashboard cannot be directly detected. Thus, when an occupant driving a vehicle is in a distracted state of gazing at a device such as a smartphone disposed in the dashboard, it is not easy to detect the distracted state of the occupant.

A method of monitoring a line of sight of an occupant is conceivable as a method of detecting whether the occupant is in the distracted state of gazing at the smartphone during traveling of the vehicle. In one example, in consideration of the fact that the smartphone is disposed at a left-right center part of the dashboard, when the line of sight of the occupant is directed to the left-right center part of the dashboard, the occupant is determined to be in the distracted state of gazing at the smartphone, and is warned of the distracted state. However, in such a case, an erroneous warning may be issued to the occupant who is merely looking at a front end of the vehicle during the traveling. This is problematic in that the occupant may feel inconvenient.

It is desirable to provide an occupant state monitoring apparatus that can accurately monitor a state of an occupant who is in a vehicle.

Hereinafter, an occupant state monitoring apparatus 11 according to an embodiment of the disclosure will be described in detail with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1B:
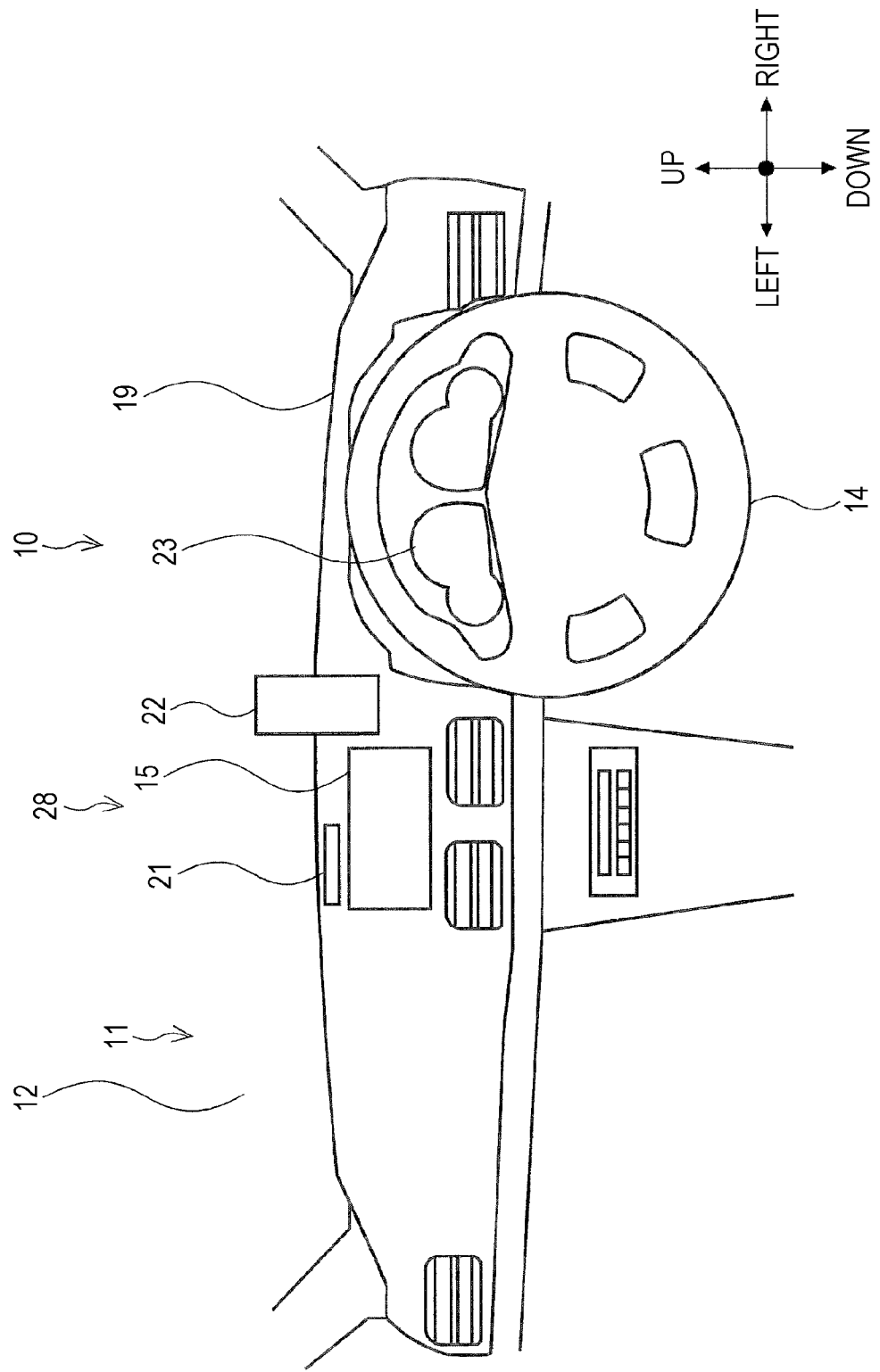
FIG. 1B is a view illustrating a front part of a vehicle interior of the vehicle including the occupant state monitoring apparatus according to the embodiment of the disclosure.

FIG. 1A is a side view illustrating a vehicle 10 including the occupant state monitoring apparatus 11. FIG. 1B is a view illustrating a front part of a vehicle interior of the vehicle 10 including the occupant state monitoring apparatus 11.

The occupant state monitoring apparatus 11 monitors a state of an occupant 18 who is in the vehicle 10. The occupant state monitoring apparatus 11 mainly includes an imager 21, a storage 25, and a calculation controller 26. A detailed function and configuration of the occupant state monitoring apparatus 11 will be described later with reference to FIG. 2 and subsequent drawings.

The vehicle 10 is, for example, an automobile, a train, or the like. The vehicle 10 as the automobile is, for example, an engine mounted vehicle, an electrical vehicle (EV), a hybrid electrical vehicle (HEV), or a plug-in hybrid electrical vehicle (PHEV).

The occupant 18 who drives the vehicle 10 sits in a seat 13 which is a driver's seat. The occupant 18 drives the vehicle 10 by operating a brake pedal, an accelerator pedal, and the like, which are not illustrated and a steering wheel 14.

A windshield 12 is disposed on a front side of a vehicle body 28.

As illustrated in FIG. 1B, a display 15 is disposed near a left-right center of a dashboard 19. The display 15 is a multi-function display that collectively displays various kinds of information related to the vehicle 10. For example, the various kinds of information include an outside air temperature, an operation status of an air conditioner, and the like. The display 15 also serves as a notifier that displays an alarm to be described later. Here, the notifier may be a speaker that emits a warning sound.

The imager 21 is disposed above the display 15 in the dashboard 19. The imager 21 is configured to capture an image of, for example, a head 31 of the occupant 18 who drives the vehicle 10. The imager 21 is referred to as a driver monitor system (DMS). The imager 21 is, for example, an infrared camera or the like.

An instrument cluster 23 is disposed behind an upper part of the steering wheel 14. The instrument cluster 23 displays a vehicle speed, an engine rotational speed, and the like.

A portable device 22 may be disposed near the left-right center of the dashboard 19. In one embodiment, the portable device 22 may serve as a "device". The portable device 22 is, for example, a communication device such as a smartphone. The portable device 22 is detachable from the dashboard 19.

The occupant state monitoring apparatus 11 monitors, with the imager 21, the state of the occupant 18 who drives the vehicle 10, and when performing a determination that the occupant 18 is, for example, in a distracted state of continuously looking at the portable device 22, notifies the occupant 18 of a result of the determination. Consequently, the occupant 18 can recognize his or her own distracted state by notification, and can return to a normal state of concentrating on a driving operation from the distracted state. Such an operation will be described later with reference to a flowchart.

Figure 2:
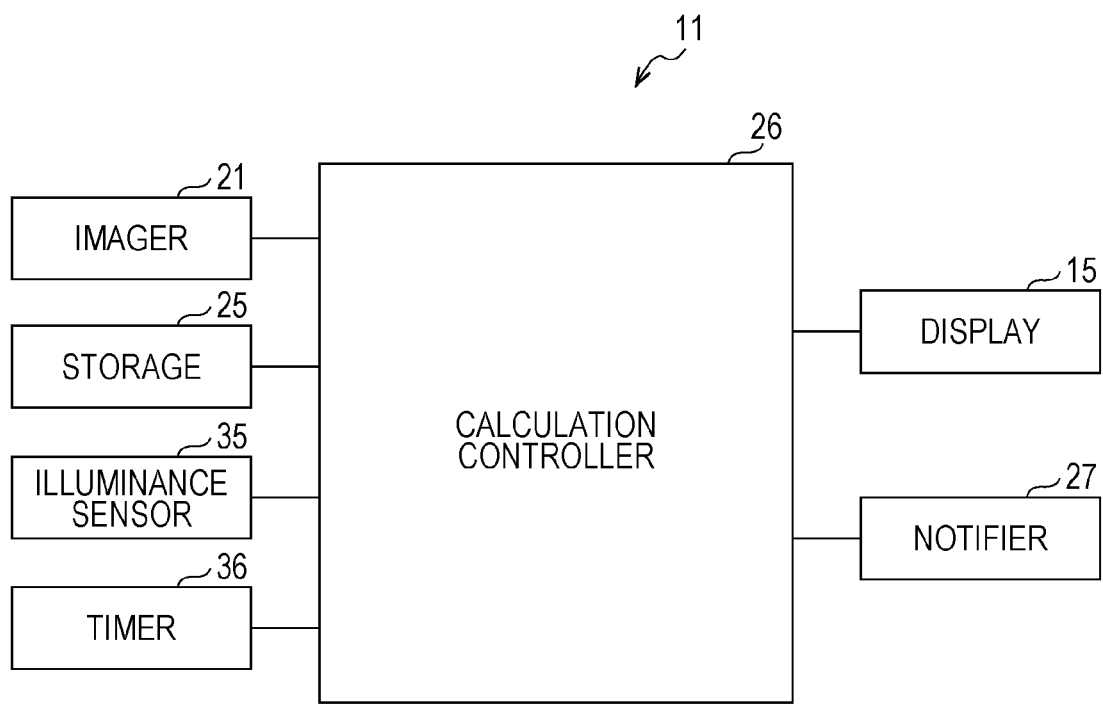
FIG. 2 is a block diagram illustrating a connection configuration of the occupant state monitoring apparatus according to the embodiment of the disclosure.

FIG. 2 is a block diagram illustrating a connection configuration of the occupant state monitoring apparatus 11.

The occupant state monitoring apparatus 11 mainly includes the calculation controller 26, the imager 21, the storage 25, an illuminance sensor 35, a timer 36, the display 15, and a notifier 27.

The calculation controller 26 includes a central processing unit (CPU), a random-access memory (RAM), a read-only memory (ROM), and the like. The calculation controller 26 has input-side terminals coupled to the imager 21, the storage 25, the illuminance sensor 35, and the timer 36. The calculation controller 26 has output-side terminals coupled to the display 15 and the notifier 27. As will be described later, the calculation controller 26 detects, based on a part of an eyeball 20 reflected in an image 29, the line of sight of the occupant 18 and the device disposed in a vehicle interior 16, and monitors the distracted state as the state of the occupant 18 based on a change in the line of sight and the device.

The imager 21 images the occupant 18 who is in the vehicle 10. The imager 21 is, for example, an infrared camera, and can image the head 31 of the occupant 18 during the day and at night.

The storage 25 stores information used for detecting the distracted state of the occupant 18 using the occupant state monitoring apparatus 11. For example, the storage 25 stores an eyeball part image 32, a first eyeball part image 33, a second eyeball part image 34, the image 29, and the like, which will be described later.

The illuminance sensor 35 is a photodiode or the like that detects brightness in the vehicle interior 16 or brightness outside the vehicle 10. The illuminance sensor 35 outputs an electrical signal indicating the brightness to the calculation controller 26. Whether traveling is in the daytime or the nighttime is detected by detecting the brightness with the illuminance sensor 35. Consequently, as will be described later, the method of detecting the distracted state of the occupant 18 is switchable, and the distracted state can be detected with high accuracy. The illuminance sensor 35 can be a sensor included in a car navigation system, an automatic light system, or the like.

The timer 36 measures time or a time period. With the timer 36, whether traveling of the vehicle 10 is in the daytime or the nighttime is detected.

As described above, the display 15 displays various kinds of information related to the vehicle 10.

The notifier 27 is, for example, a speaker disposed in the vehicle body 28. When a determination is performed that the occupant 18 is in the distracted state, the notifier 27 notifies, by sound, the occupant 18 of a result of the determination.

Figure 3A:
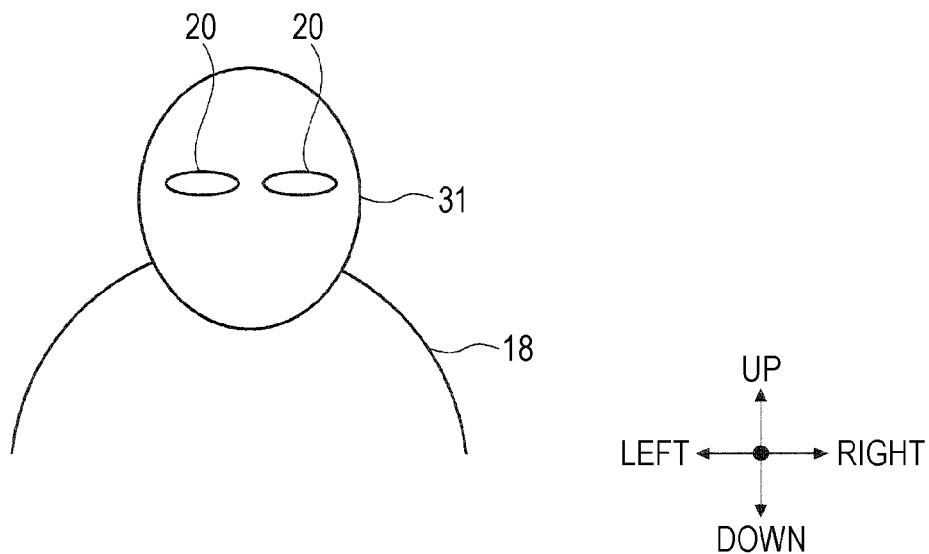
FIG. 3A is a schematic diagram illustrating a state of an occupant in the occupant state monitoring apparatus according to the embodiment of the disclosure.

FIG. 3A is a schematic diagram illustrating the state of the occupant 18 imaged by the imager 21. The imager 21 images the eyeballs 20 of the head 31 of the occupant 18. Furthermore, the calculation controller 26 calculates, for example, a gaze direction from a video obtained by imaging the head 31 or the eyeballs 20. The gaze direction is a direction in which the occupant 18 gazes.

Figure 3B:
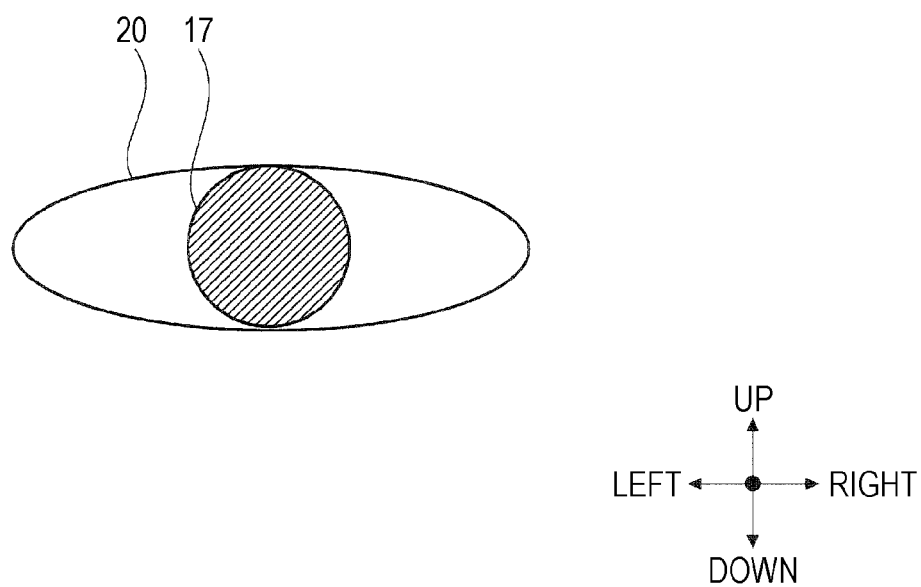
FIG. 3B is a schematic diagram illustrating an eyeball of the occupant in the occupant state monitoring apparatus according to the embodiment of the disclosure.

FIG. 3B illustrates the eyeball 20 and an iris part 17 of the occupant 18. The iris part 17 is a colored part of an eye of the occupant 18, includes at least one of a pupil and an iris of the eyeball 20. The iris part 17 may consist of a pupil and an iris of the eyeball 20. The eyeball 20 reflects a light beam on a surface thereof. Thus, while the occupant 18 drives the vehicle 10, a forward view of the vehicle 10, the dashboard 19, and the like are reflected in the surface of the eyeball 20. In the present embodiment, as will be described later, an object viewed by the occupant 18 is detected using such a phenomenon.

Figure 4:
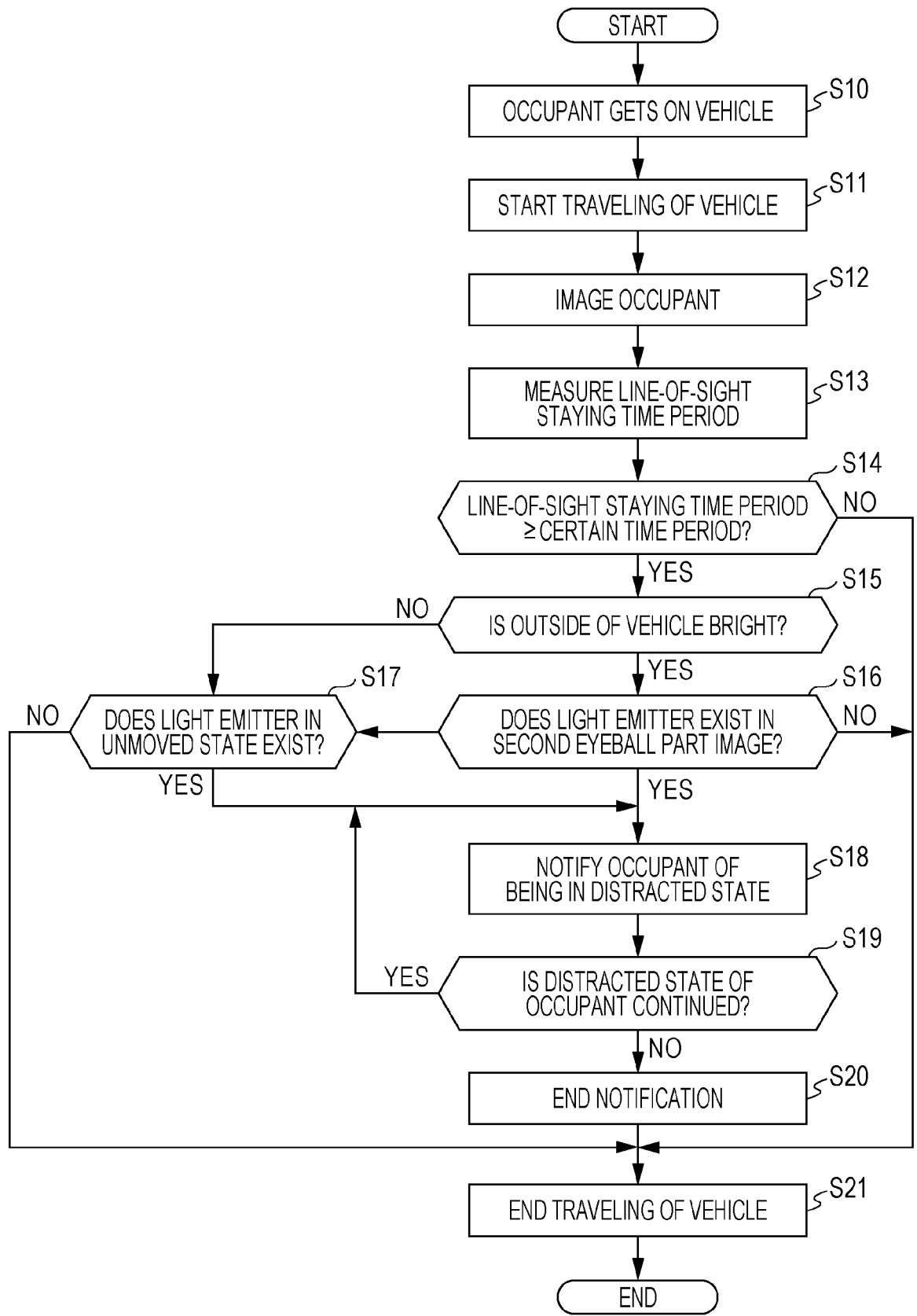
FIG. 4 is a flowchart illustrating a method of monitoring the state of the occupant according to the embodiment of the disclosure.

FIG. 4 is a flowchart illustrating a method of monitoring the state of the occupant 18. Referring to FIG. 4, a method for monitoring the distracted state as the state of the occupant 18 by the occupant state monitoring apparatus 11 will be described.

In step S10, the occupant 18 gets on the vehicle 10.

In step S11, the vehicle 10 starts traveling based on an instruction from the occupant 18.

In step S12, the calculation controller 26 causes the imager 21 to image the head 31 and the eyeballs 20 of occupant 18. The calculation controller 26 continues the imaging with the imager 21 until the traveling of vehicle 10 is ended.

In step S13, the calculation controller 26 measures a time period during which the line of sight of the occupant 18 stays (hereinafter referred to as a "line-of-sight staying time period").

In one example, the calculation controller 26 determines whether the line of sight of the occupant 18 is directed to the portable device 22 based on the position of the iris part 17, the posture of the occupant 18, the position or angle of the head 31, and the like. If the portable device 22 is disposed in the vicinity of the left-right center of the dashboard 19, for example, the calculation controller 26 determines whether the line of sight of the occupant 18 is directed to the vicinity of the left-right center of the dashboard 19 based on the image obtained by imaging the occupant 18 with the imager 21.

Furthermore, the calculation controller 26 determines whether the line of sight of the occupant 18 stays in the direction toward the portable device 22. Thereafter, when the line of sight of the occupant 18 stays, the calculation controller 26 causes the timer 36 to measure the line-of-sight staying time period.

In step S14, the calculation controller 26 determines whether the line-of-sight staying time period is longer than a predetermined threshold time period. Consequently, the calculation controller 26 determines whether the line-of-sight staying time period is equal to or longer than a certain time period.

If an affirmative decision "YES" is obtained in step S14, that is, if the line-of-sight staying time period is equal to or longer than the certain time period (in other words, if the movement of the line of sight of the occupant 18 is small) the calculation controller 26 proceeds to step S15.

If a negative decision "NO" is obtained in step S14, that is, if the line-of-sight staying time period is not equal to or longer than the certain time period (in other words, if the movement of the line of sight of the occupant 18 is large) the calculation controller 26 proceeds to step S21. In this case, the calculation controller 26 determines that the occupant 18 is not in the distracted state and does not provide the notification to the occupant 18.

In step S15, the calculation controller 26 determines whether the outside of the vehicle 10 is bright. In one example, the calculation controller 26 determines that the outside of the vehicle 10 is bright when a light amount of a vehicle external environment detected by the illuminance sensor 35 is equal to or greater than a certain value. Furthermore, the calculation controller 26 can also determine whether the current time is in the daytime or in the nighttime based on the time measured by the timer 36, determine that the outside of the vehicle is bright when the current time is in the daytime, and determine that the outside of the vehicle is not bright when the current time is in the nighttime.

If an affirmative decision "YES" is obtained in step S15, that is, if the light amount in the vehicle external environment of the vehicle 10 is equal to or greater than the certain value, the calculation controller 26 proceeds to step S16.

If a negative decision "NO" is obtained in step S15, that is, if the light amount in the vehicle external environment of the vehicle 10 is less than the certain value, the calculation controller 26 proceeds to step S17.

In step S16, the calculation controller 26 determines whether the portable device 22 exists in the captured image. In one embodiment, the portable device 22 is an example of a light emitter 30.

Figure 5A:
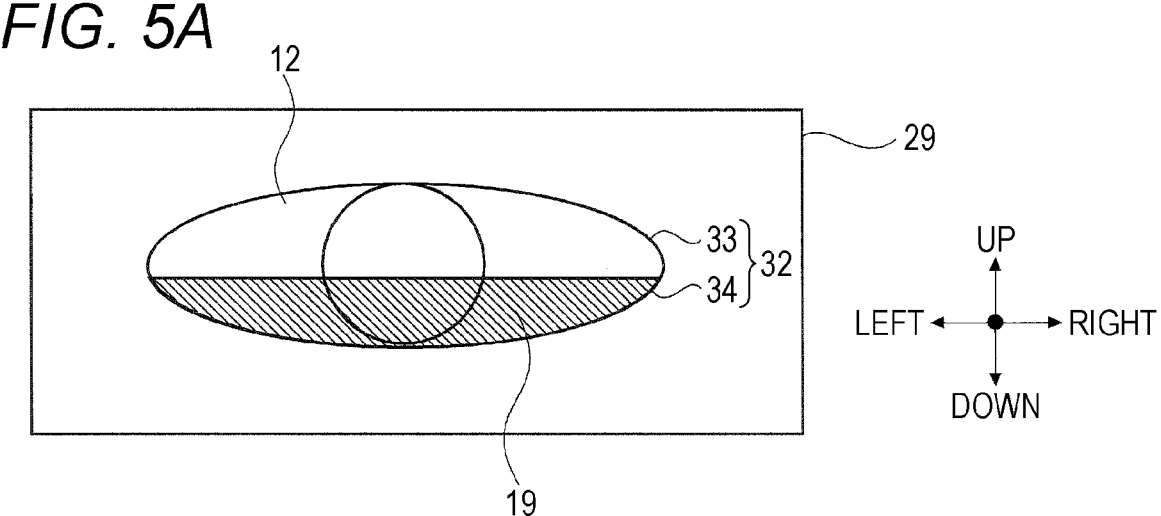
FIG. 5A is a schematic diagram illustrating an eyeball part image in the occupant state monitoring apparatus according to the embodiment of the disclosure.

In one example, FIG. 5A illustrates the image 29 captured by the imager 21. The image 29 is a part of an image obtained by imaging the head 31 of the occupant 18 with the imager 21. The image 29 includes the eyeball part image 32. The eyeball part image 32 represents a part, within the image 29, where the eyeball 20 of the occupant 18 is reflected.

The eyeball part image 32 includes the first eyeball part image 33 representing an upper part thereof and the second eyeball part image 34 representing a lower part thereof.

The first eyeball part image 33 represents the upper part of the eyeball part image 32 where a vehicle forward view of the vehicle 10 is reflected through the windshield 12 illustrated in FIG. LA. When the outside of the vehicle 10 is bright because the vehicle 10 travels in the daytime, the first eyeball part image 33 is reflected brightly. On the other hand, when the outside of the vehicle 10 is dark because the vehicle 10 travels in the nighttime, the first eyeball part image 33 is reflected darkly.

The second eyeball part image 34 represents the lower part of the eyeball part image 32 where the dashboard 19 illustrated in FIG. 1A is reflected. In one embodiment, the dashboard 19 may serve as a "vehicle member". A surface of the dashboard 19 is generally colored black. Thus, when the outside of the vehicle is bright, the second eyeball part image 34 is reflected darker than the first eyeball part image 33.

Figure 5B:
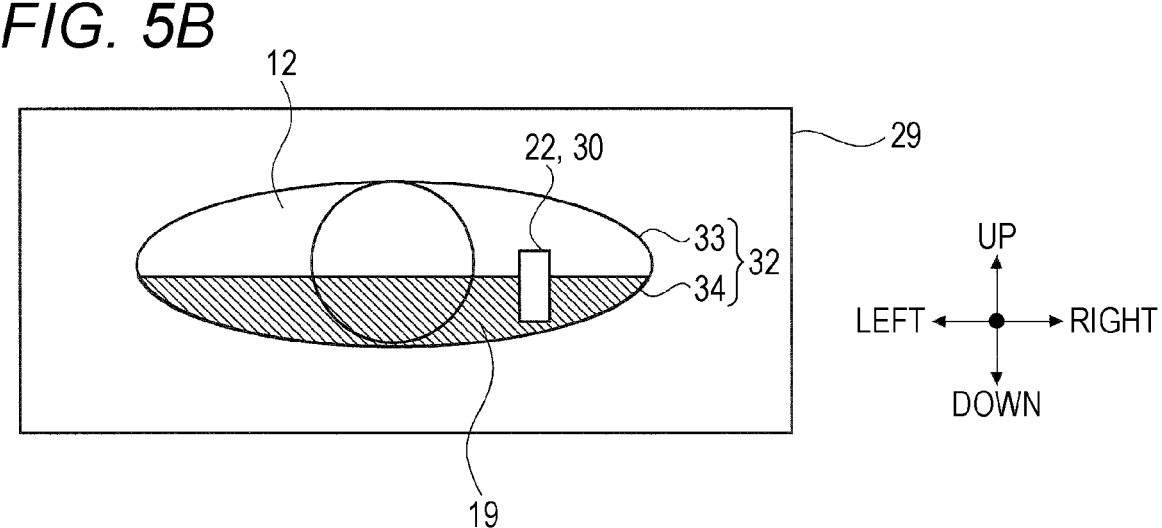
FIG. 5B is a schematic diagram illustrating an eyeball part image in a case where the outside of the vehicle is bright, in the occupant state monitoring apparatus according to the embodiment of the disclosure.

As illustrated in FIG. 1A, in the dashboard 19, the portable device 22, for example, a smartphone, may be disposed as the light emitter 30. In this case, referring to FIG. 5B, the portable device 22 is reflected in the eyeball part image 32 brighter than the dashboard 19 because a screen of the portable device 22 is a screen using a liquid crystal display or an organic EL that emits light. For example, in the second eyeball part image 34 in which the dashboard 19 is reflected darkly, the lower part of the portable device 22 is reflected noticeably brightly.

Consequently, it is possible to determine whether the occupant 18 is distracted by the portable device 22 disposed in the dashboard 19 by checking whether the light emitter 30 exists in the second eyeball part image 34. That is, when the light emitter 30 exists in the second eyeball part image 34, it can be determined that occupant 18 is distracted by the portable device 22 disposed in dashboard 19. On the other hand, when the light emitter 30 does not exist in the second eyeball part image 34, it can be determined that the portable device 22 is not disposed in the dashboard 19 and the occupant 18 is not distracted by the portable device 22.

Thus, in step S16, if the light emitter 30 exists in the second eyeball part image 34, the calculation controller 26 determines that occupant 18 is in the distracted state. On the other hand, if the light emitter 30 does not exist in the second eyeball part image 34, the calculation controller 26 determines that occupant 18 is not in the distracted state.

If an affirmative decision "YES" is obtained in step S16, that is, if it is determined that the occupant 18 is in the distracted state because the light emitter 30 exists in the second eyeball part image 34, the calculation controller 26 proceeds to step S18.

If a negative decision "NO" is obtained in step S16, that is, if it is determined that the occupant 18 is not in the distracted state because the light emitter 30 does not exist in the second eyeball part image 34, the calculation controller 26 proceeds to step S21 and does not provide the notification.

In step S17, the calculation controller 26 determines whether the light emitter 30 in an unmoved state exists in the captured image.

Figure 5C:
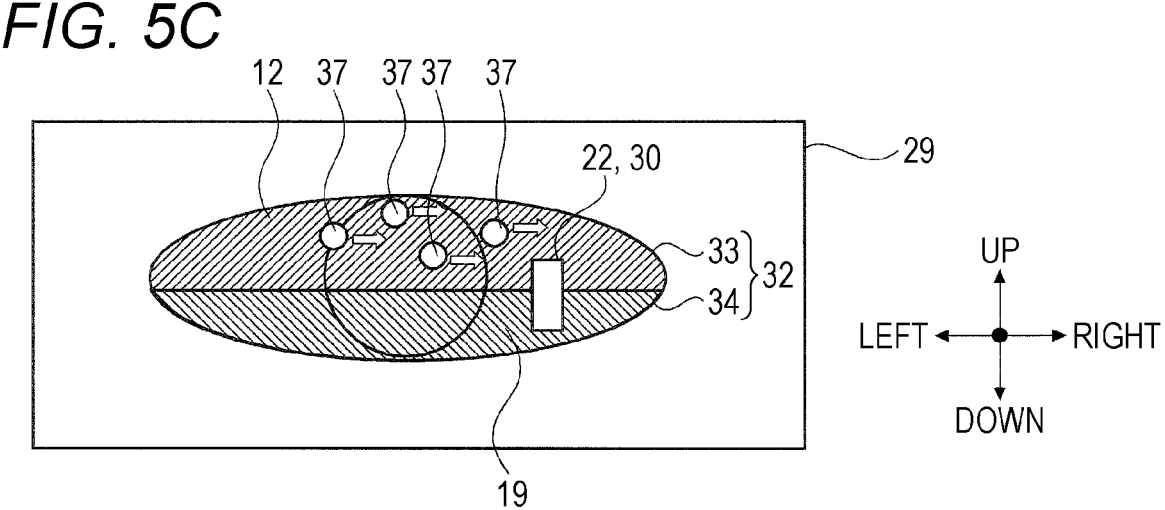
FIG. 5C is a schematic diagram illustrating an eyeball part image in a case where the outside of the vehicle is dark, in the occupant state monitoring apparatus according to the embodiment of the disclosure.

FIG. 5C illustrates the image 29 in step S17. When the outside of the vehicle is dark in the nighttime, the first eyeball part image 33 and the second eyeball part image 34 are both reflected darkly. When the vehicle 10 travels in the nighttime, a moving light emitter 37 is reflected in the eyeball part image 32. The moving light emitter 37 moves in the eyeball part image 32. The moving light emitter 37 is caused by, for example, light emitted from a head lamp of a vehicle traveling in an opposite (counter) lane, and is a factor that represents the outside of the vehicle. Thus, whether the moving light emitter 37 exists is not related to the distracted state of the occupant 18.

When the portable device 22 is disposed in the dashboard 19 in the nighttime, the light emitter 30, which is the portable device 22 whose screen emits light, is reflected in the eyeball part image 32. The light emitter 30 is a factor that represents the inside of the vehicle interior 16 because the light emitter 30 is fixed to a predetermined position of the dashboard 19. The light emitter 30 is unmoved during traveling of the vehicle 10.

Consequently, in step S17, if the portable device 22, which is the light emitter 30 in the unmoved state, exists in the eyeball part image 32, it is determined that the occupant 18 is distracted by the portable device 22.

If an affirmative decision "YES" is obtained in step S17, that is, if the portable device 22, which is the light emitter 30 in the unmoved state, exists in the eyeball part image 32, the calculation controller 26 proceeds to step S18.

If a negative decision "NO" is obtained in step S17, that is, if the portable device 22, which is the light emitter 30 in the unmoved state, does not exist in the eyeball part image 32, the calculation controller 26 proceeds to step S21 and does not provide the notification.

In step S18, the calculation controller 26 provides the notification to the occupant 18. In one example, the calculation controller 26 causes a speaker or the like which is the notifier 27 to emit a voice or a warning sound in order to return the state of the occupant 18 from the distracted state to the normal state of concentrating on a driving operation. The notifier 27 may be the display 15. In this case, the display 15 displays an image for returning the state of the occupant 18 from the distracted state to the normal state. Providing the notification to the occupant 18 through the notifier 27 allows the occupant 18 to return to the normal state from the distracted state.

In step S19, the calculation controller 26 determines whether the distracted state of the occupant 18 is continued. The process in step S19 is similar to those in steps S13 to S17 described above.

If an affirmative decision "YES" is obtained in step S19, that is, if the distracted state of the occupant 18 is continued, the calculation controller 26 returns to step S18 and continues the notification.

If a negative decision "NO" is obtained in step S19, that is, if the distracted state of the occupant 18 is discontinued, the calculation controller 26 proceeds to step S20.

In step S20, the calculation controller 26 ends the notification with the notifier 27.

In step S21, the occupant 18 ends traveling of the vehicle 10. That is, the occupant 18 stops the vehicle 10.

The foregoing description is related to the operation for monitoring the distracted state as the state of the occupant 18 by the occupant state monitoring apparatus 11.

According to the occupant state monitoring apparatus 11 of the present embodiment, the device disposed in the vehicle interior 16 is detected based on the eyeball 20 of the occupant 18 reflected in the image 29, and thus, for example, it is possible to effectively determine the distracted state of the occupant 18 who continues to gaze at the portable device 22 which is the device. Furthermore, in the occupant state monitoring apparatus 11, since the distracted state is detected and notified based on both the line-of-sight of the occupant 18 and the portable device, it is possible to reduce erroneous notification based on erroneous detection of the distracted state, thus avoiding making the occupant 18 feel inconvenient.

In addition, in step S14 described above, the state of the occupant 18 can be more accurately determined by determining that the occupant 18 is in the distracted state when the gaze time period exceeds the certain time period.

In addition, in steps S16 and S17 described above, it is possible to accurately detect a state where the occupant 18 gazes at the portable device 22, which is a device disposed on the vehicle member which is, for example, the dashboard 19. Furthermore, it is possible to easily detect the distracted state where the occupant 18 gazes at a portable communication device or the like as an example of the light emitter 30.

Furthermore, in step S15 described above, the decision process branches based on the brightness outside the vehicle, and thus, it is possible to determine, during the day and night, whether the occupant 18 is in the distracted state.

Although the embodiment of the disclosure has been described above, the disclosure is not limited thereto, and modifications can be made without departing from the gist of the disclosure. In addition, the above-described modes can be combined with each other.

For example, in the above-described embodiment, although the monitoring target state of the calculation controller 26 is the distracted state, the monitoring target state may be any state other than the distracted state. For example, the monitoring target state of the calculation controller 26 may be a state where the posture of the occupant 18 becomes considerably unbalanced.

The invention claimed is:

1. An occupant state monitoring apparatus comprising:
a camera configured to capture an image of a region including an eyeball of an occupant who is in a vehicle, to obtain an image, wherein the captured image includes an image portion corresponding to the eyeball;
one or more processors; and
one or more memories configured to store a program to be executed by the one or more processors causing the one or more processors to:
detect, from the image portion corresponding to the eyeball, a light-emitting object reflected in the eyeball and a position of the light-emitting object in the image portion; and
determine, based on the position of the light-emitting object in the image portion, that the occupant is in a distracted state influenced by the light-emitting object disposed in a compartment of the vehicle, wherein
the image portion corresponding to the eyeball comprises a first eyeball part image where a forward view of the vehicle is reflected and a second eyeball part image where a vehicle member of the vehicle is reflected, and
the one or more processors are configured to determine that the occupant is in the distracted state when the light-emitting object exists in the second eyeball part image.

2. The occupant state monitoring apparatus according to claim 1, wherein the one or more processors are configured to determine that the occupant is in the distracted state when a gaze time period during which the occupant gazes at the light-emitting object is equal to or longer than a predetermined time period.

3. The occupant state monitoring apparatus according to claim 2, wherein the one or more processors are further configured to determine that the occupant is in the distracted state when the light-emitting object in an unmoved state exists in the image portion corresponding to the eyeball.

4. The occupant state monitoring apparatus according to claim 3, wherein the one or more processors are further configured to cause a determination method to differ according to brightness outside the vehicle, the determination method determining, based on the image portion corresponding to the eyeball, whether the occupant is in a distracted state.

5. The occupant state monitoring apparatus according to claim 2, wherein the one or more processors are further configured to cause a determination method to differ according to brightness outside the vehicle, the determination method determining, based on the image portion corresponding to the eyeball, whether the occupant is in a distracted state.

6. The occupant state monitoring apparatus according to claim 1, wherein the one or more processors are further configured to determine that the occupant is in the distracted state when the light-emitting object in an unmoved state exists in the image portion corresponding to the eyeball.

7. The occupant state monitoring apparatus according to claim 6, wherein the one or more processors are further configured to cause a determination method to differ according to brightness outside the vehicle, the determination method determining, based on the image portion corresponding to the eyeball, whether the occupant is in a distracted state.

8. The occupant state monitoring apparatus according to claim 1, wherein the one or more processors are further configured to cause a determination method to differ according to brightness outside the vehicle, the determination method determining, based on the image portion corresponding to the eyeball, whether the occupant is in a distracted state.

9. An occupant state monitoring apparatus comprising:
a camera configured to capture an image of a region including an eyeball of an occupant who is in a vehicle, to obtain an image; and
one or more processors; and
one or more memories configured to store a program to be executed by the one or more processors causing the one or more processors to:
detect, based on a part of the eyeball reflected in the image, a line of sight of the occupant and a device disposed in a compartment of the vehicle, and
monitor a state of the occupant based on the device and a change in the line of sight,
wherein the part of the eyeball reflected in the image comprises a first eyeball part image where a forward view of the vehicle is reflected and a second eyeball part image where a vehicle member of the vehicle is reflected, and
wherein the one or more processors are configured to determine that the occupant is in a distracted state when the device exists in the second eyeball part image.

10. The occupant state monitoring apparatus according to claim 9, wherein the one or more processors are further configured to determine that the occupant is in the distracted state when a light emitter in an unmoved state exists in the part of the eyeball reflected in the image.

11. The occupant state monitoring apparatus according to claim 10, wherein the one or more processors are further configured to cause a determination method to differ according to brightness outside the vehicle, the determination method determining, based on the part of the eyeball reflected in the image, whether the occupant is in a distracted state.

12. The occupant state monitoring apparatus according to claim 9, wherein the one or more processors are further configured to cause a determination method to differ according to brightness outside the vehicle, the determination method determining, based on the part of the eyeball reflected in the image, whether the occupant is in the distracted state.

13. An occupant state monitoring apparatus comprising:
a camera configured to capture an image of a region including an eyeball of an occupant who is in a vehicle, to obtain an image, wherein the captured image includes an image portion corresponding to the eyeball; and
circuitry configured to:
detect, from the image portion corresponding to the eyeball, a light-emitting object reflected in the eyeball and a position of the light-emitting object in the image portion; and
determine, based on the position of the light-emitting object in the image portion, that the occupant is in a distracted state influenced by the light-emitting object disposed in a compartment of the vehicle, wherein
the image portion corresponding to the eyeball comprises a first eyeball part image where a forward view of the vehicle is reflected and a second eyeball part image where a vehicle member of the vehicle is reflected, and the circuitry is configured to determine that the occupant is in the distracted state when the light-emitting object exists in the second eyeball part image.

* * * * *